3,288,638
METHOD AND APPARATUS FOR THE TREATMENT OF PLASTIC MATERIALS
Hugo L. L. van Paassen and Angelo Guimento, Baltimore, Md., assignors to Martin-Marietta Corporation, Baltimore, Md., a corporation of Maryland
Filed Oct. 9, 1962, Ser. No. 229,407
5 Claims. (Cl. 117—213)

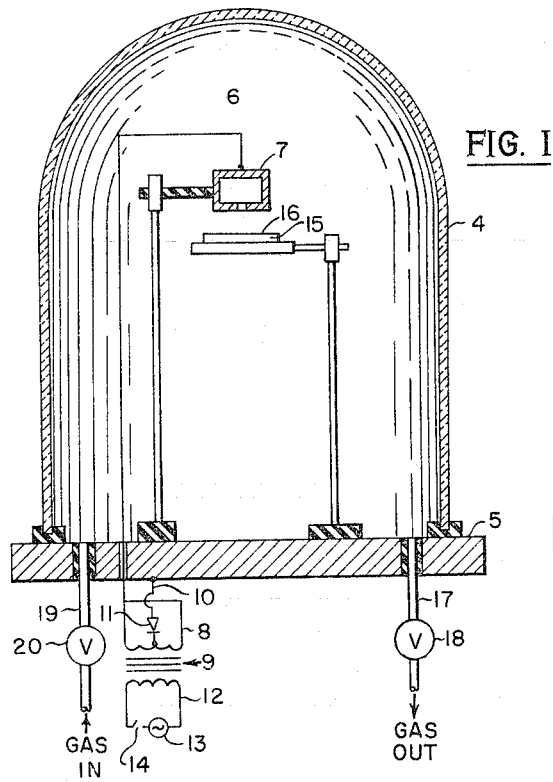
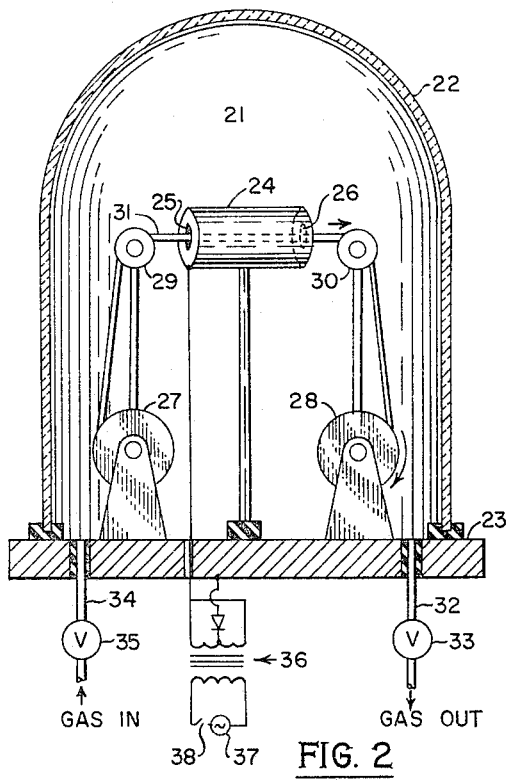
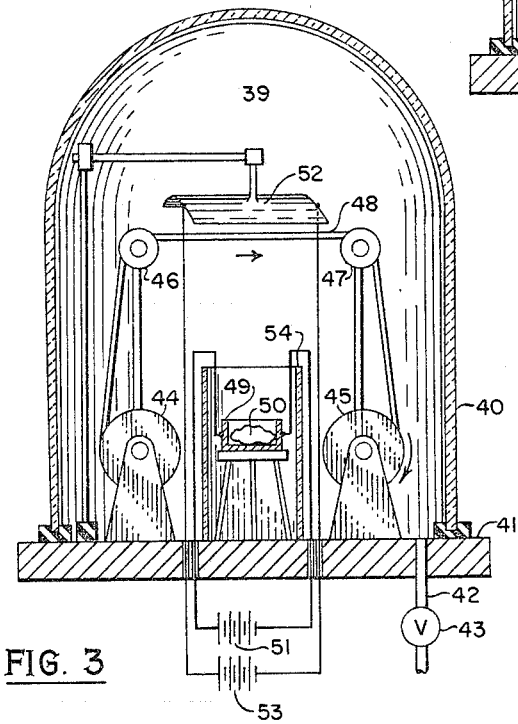
INVENTORS
HUGO L. L. van PAASSEN
ANGELO GUIMENTO
BY
*Robert S. Berger*
ATTORNEY United States Patent Office 3,288,638
Patented Nov. 29, 1966

This invention relates to a method and apparatus for treating the surfaces of plastic materials. More particularly, a method and means are provided whereby the adhesive characteristics of organic plastic materials are greatly enhanced to render the surfaces thereof suitable for the reception and retention of various types of coatings.

Many organic plastic materials, such as polyethylene for example, are being employed extensively in the arts because of the numerous advantages inherent in such materials. Because of their excellent electrical insulating properties, heat resistance, chemical inertness, low loss tangent and good mechanical strength, certain of these materials, such as polytetrafluoroethylene and polytrifluorochloroethylene, are unusually well suited for various applications in the electrical field. These materials can be used to provide the electrical insulation for conductors, as a base material for printed circuits, as the dielectric material for capacitors, etc. These and other organic plastics are well suited for use as wrapping or packaging materials.

However, many organic plastic materials have one undesirable physical characteristic in that their surfaces have a low adherency for other substances. In many of the above referred to applications, it is necessary that a metal coating be applied to the plastic surface. In addition, in virtually every application made of organic plastic materials it is desirable, if not in fact a critical requirement, that they be imprinted with some identifying mark. Because of the paraffin-like surface properties and the inertness of these materials, metal coatings, conventional printing inks and other substances cannot satisfactorily be applied to their untreated surfaces and slight abrasion is sufficient to remove virtually any coating applied thereto.

Consequently, many methods have heretofore been proposed to alter the surface characteristics of the types of plastic materials under consideration in order to render them adherent to various types of coatings. In general these processes have either been chemical or electrical in nature. The proposed chemical treatments are very expensive and time-consuming. While the method of the present invention may be classified as an electrical process, it has been found to be far more effective and less time-consuming than any process heretofore devised.

It is therefore a primary object of the present invention to provide a method whereby the adhesive characteristics of organic plastic materials may be greatly enhanced to render their surfaces receptive to various coatings. An extremely effective and efficient method and apparatus are provided for treating the surface of an organic plastic material so as to improve the printing and coating properties thereof. A method is also provided whereby a strong bond can be formed between an organic plastic insulated electrical conductor and an outer metal coating.

These and other objects and advantages of this invention will become obvious as the following description of same is read in connection with the accompanying drawings in which:

FIGURE 1 is a diagrammatic view illustrating a preferred embodiment of the surface treating apparatus of the present invention;

FIGURE 2 is a diagrammatic view illustrating a second embodiment of the surface treating apparatus of the present invention which is ideally suited for treating the surface of an organic plastic insulated electrical conductor; and FIGURE 3 is a diagrammatic view illustrating a means for applying a metal coating to a surface-treated organic plastic insulated electrical conductor.

This invention basically consists in subjecting the surface of an organic plastic material to a gaseous discharge to improve the adhesive characteristics thereof. In addition, it has been found that by utilizing specific shapes of cathodes the surface effect on the plastic material can be greatly intensified thereby improving the effectiveness and efficiency of the process. As used herein the term GASEOUS DISCHARGE refers to that type of self-sustained normal glow electrical discharge which takes place between a pair of electrodes through an inert gas maintained at less than atmospheric pressure and wherein a substantial amount of current flows between the electrodes.

Referring first to FIGURE 1, a preferred embodiment of the present invention has been illustrated wherein a glass enclosure 4 is mounted on a metal base 5 to effectively confine a chamber 6. Mounted within the chamber 6 by any suitable means is a cathode 7, which is electrically connected to a secondary winding 8 of a step-up transformer 9 and electrically insulated from the base 5. The secondary winding 8 of the step-up transformer 9 has a center tap 10 connected to the metal base 5 and includes a rectifier 11. The primary winding 12 of the step-up transformer 9 is connected to a source of alternating electrical energy 13, a switch 14 being provided therebetween.

An organic plastic material 15 is supported from and electrically insulated from the metal base 5 by any suitable means exposing the surface 16 thereof, which surface is to be treated to improve its adhesive characteristics, to the cathode 7. Passing through an aperture in the metal base 5 is a tube 17 which is provided with a valve 18 and which connects the chamber 6 to a vacuum pump (not shown) to permit the chamber 6 to be evacuated. A tube 19 provided with a valve 20 connects the chamber 6 to a source of an inert gas such as helium, neon, argon, xenon or krypton.

In operation, the valve 18 is opened to evacuate the chamber 6 and then the valve 20 is opened to permit inert gas to flow into the chamber. The valves 18 and 20 are adjusted to maintain the proper pressure (to be hereinafter discussed in more detail) within the chamber 6 and at the same time to permit a continual flow of gas through the chamber to bleed off unwanted gaseous products. The switch 14 is then closed to impress a sufficient potential across the cathode 7 and the metal base 5 to establish a gaseous discharge within the chamber 6. Being exposed to the cathode 7 in the immediate vicinity thereof, the surface 16 of the organic plastic material 15 is subjected to the gaseous discharge which alters the condition of the surface so as to greatly enhance its adhesive characteristics.

The gaseous discharge subjects the surface 16 to a variety of conditions. This discharge heats the surface 16 and subjects it to strong electrical fields, intensive bombardment by electrons, positive ions and negative ions, and to various types of radiation including soft X-rays. While all of these conditions no doubt contribute to some extent in improving the adhesive properties of the plastic surface 16, it is believed that the intensive bombardment of the plastic surface by electrons and positive ions is chiefly responsible for the highly desirable result.

The cathode 7 may be formed of any suitable metal and is preferably formed from a metal which produces very little "sputtering." For instance, the cathode 7 may be formed of copper, while aluminum and preferably molybdenum or tantalum will provide better results. As shown in FIGURE 1, the cathode 7 is a hollow cathode formed in the shape of a can with an aperture provided in one end thereof. This shape has proven to be very effective in intensifying the surface effect on the organic plastic material 15. However, satisfactory results can be obtained by using hollow cathodes formed in other shapes and even the discharge from a flat plate cathode will improve the adhesive characteristics of the plastic surface, although in this case the surface effect is far less intensified.

The optimum gas pressure to be employed within the chamber 6 will of necessity depend upon the type of gas used, the discharge current desired and the size and shape of the cathode 7. In most applications, best results will be obtained when the pressure within the chamber 6 is between 50 and 300 microns Hg. Similarly the optimum voltage across the cathode 7 and the metal base 5 will depend upon the type of gas utilized, the pressure of same gas and the geometry of the cathode. Satisfactory results are normally obtained when the potential across these electrodes is between 300 and 700 volts. The type of material 15 being treated, the nature of the coating to be subsequently applied to the surface 16 of the material 15 and the intensity of the gaseous discharge at the surface 16 will determine the optimum time that the surface 16 should be exposed to the gaseous discharge from the cathode 7. Naturally care must be exercised not to overexpose the material 15 to assure that only the surface 16 thereof is treated and the material 15 not completely destroyed.

As illustrated in FIGURE 1, a unidirectional current continually flows between the metal base 5 and the cathode 7. While this condition produces the most uniform results on the surface 16, satisfactory surface effects also can usually be obtained by impressing an alternating potential across the electrodes. Depending on the size and shape of the surface 16 of the organic plastic material 15, it may be desirable to cause the discharge from the electrode 7 to scan the surface 16. Manual or mechanical means may readily be employed to cause the desired relative motion between the cathode 7 and the surface 16, the adaption of such means being well within the ordinary skill of a machine designer.

In FIGURE 2 a second embodiment of the surface treating apparatus of the present invention is illustrated which is ideally suited for treating the outer surface of an organic plastic insulated conductor. As shown therein, a chamber 21 is defined by a glass enclosure 22 mounted on a metal base 23 in a manner identical to that illustrated in FIGURE 1. A hollow cathode 24 is located within the chamber 21 and is supported from the base 23 by any suitable means by which it is electrically insulated therefrom. In this case the hollow cathode 24 is in the shape of a can which has apertures 25 and 26 provided in respective ends thereof. The shape of the can which forms the hollow cathode 24 may be cylindrical as illustrated in FIGURE 2 or spherical, any right polygonal prism, etc. The hollow cathode 24 may also be in the form of a pair of spaced apart flat plates. It is only necessary that the hollow cathode 24 be in a form permitting another body to be passed therethrough. A pair of rotating drums 27, 28 and a pair of idler pulleys 29, 30 are mounted on the metal base 23 within the chamber 21, the rotating drum 28 being provided with any suitable driving means. An organic plastic insulated conductor 31, the outer surface of which is to be treated to improve its adhesive characteristics, is coiled on the rotating drum 27, passes over the idler pulley 29, through the apertures 25 and 26 of the cathode 24, over the idler pulley 30 and has its free end connected to the power driven rotary drum 28.

A pipe 32 provided with a valve 33 passes through the metal base 23 to connect the chamber 21 to a vacuum pump (not shown). Similarly, a pipe 34 provided with a valve 35 connects the chamber 21 to a source of inert gas. The secondary winding of a step-up transformer 36 is connected to the cathode 24 and the metal base 23 in a manner so as to impress a D.C. voltage across the cathode and the metal base when the primary winding of the step-up transformer is connected to a source of alternating electrical energy 37. Provided between the primary winding of the step-up transformer 36 and the source of alternating electrical energy 37 is a switch 38.

In operation one end of the insulated conductor 31 is drawn over the idler pulley 29, through the hollow cathode 24, over the idler pulley 30 and connected to the power driven rotary drum 28. The glass enclosure 22 is positioned on the metal base 23, the valve 33 opened to evacuate the chamber 21 and the valve 35 opened to permit the chamber 21 to be filled with an inert gas. At this point the valves 33 and 35 are adjusted to maintain the proper pressure within the chamber 6 and at the same time to permit a continual flow of gas through the chamber to thereby bleed off unwanted gaseous products. The switch 38 is closed to establish a gaseous discharge between the hollow cathode 24 and the metal base 23. After the gaseous discharge has been established, the powered drum 28 is energized to draw the insulated conductor 31 from the drum 27 and through the hollow cathode 24. As the insulated conductor passes through the hollow cathode 24, its outer surface is subjected to an intensified surface effect by the gaseous discharge within the chamber 21, thereby greatly enhancing its adhesive characteristics.

The novel application of the hollow cathode 24 greatly intensifies the surface effect on the insulated conductor 31. This hollow cathode 24 may be formed of sheet metal or of wire mesh screening, either of which produces excellent results. The optimum velocity of the insulated conductor 31 through the hollow cathode 24 is dependent upon the type of insulating material employed on the conductor, the type of gas within the chamber 21 and the voltage across the cathode 24 and the metal base 23. Two or more hollow cathodes 24 may be used in series in order to increase the surface effect on the insulated conductor 31 as it passes from the rotating drum 27 to the rotating drum 28. The surface effect on the insulated conductor 31 may also be increased by employing direction reversing pulleys between the cathode 24 and the idler pulleys 29, 30 in order to cause the insulated conductor to make several passes through the cathode in traveling from the rotating drum 27 to the rotating drum 28. The utilization of either of these alternate modes of operation will affect the selection of the optimum velocity for the insulated conductor 31.

The outer surface of an organic plastic insulated conductor which has been treated by the process illustrated in FIGURE 2 may now be provided with a metal coating by the vapor deposition process illustrated in FIGURE 3. As shown in FIGURE 3, a chamber 39 is defined by a glass enclosure 40 which seats on a base 41. A pipe 42 passes through an aperture in the base 41 to connect the chamber 39 to a vacuum pump (not illustrated) and is further provided with a valve 43. Located within the chamber 39 and mounted to the base 41 are a pair of rotating drums 44, 45, the latter of which is power driven, and a pair of idler pulleys 46, 47. An organic plastic insulated conductor 48, the outer surface of which has previously been subjected to a gaseous discharge in accordance with the process illustrated in FIGURE 2, is coiled on the rotating drum 44 and has the free end thereof connected to the rotating drum 45 with the section of the insulated conductor 48 intermediate of the rotating drums 44, 45 passing over the idler pulleys 46, 47.

A metal boat 49 is mounted on and electrically insulated from the base 41 and contains a metal slug 50 from which the outer coating of the insulated conductor 48 is to be formed. This metal boat 49 is connected to a source of direct electrical energy 51. The slug 50 may be of any type of metal normally used in the vapor deposition art such as lead, tin, aluminum, copper, etc. Also mounted from and electrically insulated from the metal base 41 is a reflector plate 52 the ends of which are electrically connected, respectively, to the terminals of a source of direct electrical energy 53. A glass chimney 54 is disposed around the boat 49 in order that the vapors emitted therefrom will be directed towards the reflector plate 52.

In operation the free end of the insulated conductor 48 is first passed over the idler pulleys 46, 47 and connected to the powered rotating drum 45. The glass enclosure 40 is then positioned on the base 41 and the valve 43 opened to evacuate the chamber 39 and to maintain a pressure therewithin of $10^{-5}$ millimeters Hg or less.

At this point the metal boat 49 and the reflector plate 52 are connected to the sources of electrical energy 51 and 53 respectively, which may be either D.C. as illustrated in FIGURE 3 or A.C. A metal must be selected for forming the boat 49 which has a melting temperature above the vaporizing temperature of the metal slug 50 and which will not alloy therewith, while the source of electrical energy 51 must be of sufficient potential to resistively heat the boat 49 to the vaporizing temperature of the metal slug 50. The source of electrical energy 53 must be of sufficient potential to resistively heat the reflector plate 52 to a temperature above the vaporizing temperature of the metal slug 50 and the reflector plate must be formed of a metal which melts above the temperature to which it will be heated and which will not alloy with the metal from which the slug 50 is formed.

When the desired vaporization rate of the metal slug 50 has been obtained, the rotating drum 45 is energized to draw the insulated conductor 48 from the rotating drum 44 under the reflecting plate 52. The vapors generated from the metal slug 50 are thus deposited in a uniform manner on the treated outer surface of the insulated conductor 48. The speed at which the insulated conductor 48 is to be passed under the reflector plate 52 is determined by the desired thickness of the coating to be deposited and the vaporization rate of the metal slug 50.

Exemplary of an extremely useful and high quality product that has been formed by the metal coating process illustrated in FIGURES 2 and 3 is a superconducting delay line consisting of a niobium inner conductor 7 mils in diameter provided with a polytetrafluoroethylene insulation approximately 6 mils in thickness and having an outer coating of lead approximately $\frac{1}{20,000}$ inch in thickness. This superconducting delay line was formed by first treating the outer surface of the polytetrafluoroethylene insulation with a gaseous discharge in a manner similar to that illustrated in FIGURE 2. However, in this particular case, two hollow cathodes were employed in series, each cathode being approximately 2 inches in length by 1½ inches in diameter and having ¾ inch diameter holes in the ends thereof. These cathodes were made of #16 mesh copper wire screening and the gaseous discharge was formed through helium under a pressure of approximately 100 microns Hg. It is estimated that, after the gaseous discharge had been initiated, an A.C. potential of approximately 300 to 400 volts existed across the electrodes. The insulated conductor made four passes through the cathodes in traveling from one rotating drum to the other at a speed of approximately 40 feet per hour.

After the surface of the polytetrafluoroethylene insulation had been subjected to the gaseous discharge as described above, it was coated with lead by a vapor deposition process similar to that illustrated in FIGURE 3. A vacuum was drawn on the chamber of approximately $10^{-5}$ millimeters Hg, the lead slug heated to approximately 720° C. and the reflector plate heated to approximately 740° C. The surface-treated insulated conductor was drawn under the reflector plate at a speed of approximately 100 feet per hour. This process produced a uniform lead coating on the polytetrafluoroethylene insulation which exhibited excellent adherent characteristics with the polytetrafluoroethylene surface.

Other high quality superconducting delay lines may be formed by the process and apparatus of this invention using polytetrafluoroethylene insulated inner conductors and outer metal coatings formed of other combinations of superconducting metals such as niobium, lead and tin.

This invention may be performed and/or embodied in other ways without departing from the spirit or essential characteristics thereof. The process and embodiments of the invention described herein are therefore illustrative and not restrictive, the scope or the invention being indicated by the appended claims, and all changes which come within the meaning and range of equivalency of the claims are intended to be embraced therein.

The invention claimed is:

1. In a process for improving the adherent characteristics of a surface of a polyethylene plastic material the steps of:
    (a) establishing a gaseous discharge between a hollow cathode and an anode spaced a distance therefrom, and said hollow cathode being in the form of a can having an aperture in each end thereof of sufficient size to permit said material to be passed therethrough; and
    (b) passing said material through said apertures.

2. A process for applying a metal coating to a polytetrafluoroethylene insulated electrical conductor comprising the steps of:
    (a) establishing a gaseous discharge between a hollow cathode and an anode spaced a distance therefrom, said hollow cathode being in the form of a can having an aperture in each end thereof of sufficient size to permit said conductor to be passed therethrough;
    (b) subjecting the outer surface of said insulated conductor to said gaseous discharge by passing said insulated conductor through said apertures; and
    (c) vapor depositing a coating of metal on said outer surface of said insulated conductor.

3. The process of claim 2 wherein said conductor is formed of a metal selected from a group of metals consisting of niobium, lead and tin and wherein said coating is also formed of a metal selected from said group of metals.

4. An apparatus for improving the adherent characteristics of the outer surface of a polytetrafluoroethylene insulated conductor comprising:
    (a) an enclosed chamber;
    (b) means for filling said chamber with an inert gas;
    (c) a source of electrical energy;
    (d) a hollow cathode mounted within said chamber and electrically connected to one terminal of said source of electrical energy, said hollow cathode being in the form of a can having an aperture provided in each end thereof of sufficient size to permit said insulated conductor to be passed therethrough;
    (e) an electrode spaced a distance from said hollow cathode and within said chamber and electrically connected to the second terminal of said source of electrical energy, said source of electrical energy being of sufficient potential to create and maintain a gaseous discharge between said hollow cathode and said electrode; and (f) a second means for passing said insulated conductor through said aperture to subject said outer surface of said insulated conductor to said gaseous discharge.

5. An apparatus for improving the adhesive characteristics of the surface of an organic plastic material comprising:
(a) an enclosed chamber;
(b) means for filling said chamber with an inert gas;
(c) a hollow cathode in the form of a can having an aperture passing completely therethrough of sufficient size to permit said material to be passed therethrough;
(d) an anode mounted in said chamber and spaced a distance from said hollow cathode;
(e) means for effecting a gaseous discharge between said hollow cathode and said anode; and
(f) means for passing said material through said aperture of said hollow cathode whereby it is subjected to said gaseous discharge.

References Cited by the Examiner

UNITED STATES PATENTS

| | | | |
|---|---|---|---|
| 2,853,402 | 9/1958 | Blois | 117—107.1 X |
| 2,932,591 | 4/1960 | Goodman | 117—93.31 X |
| 2,953,484 | 9/1960 | Tellkamp | 117—107 X |
| 3,017,339 | 1/1962 | Dewey | 204—312 X |
| 3,057,792 | 10/1962 | Frohlich | 117—47 X |
| 3,081,485 | 3/1963 | Steigerwald | 117—47 X |
| 3,132,046 | 5/1964 | Mann | 117—218 X |
| 3,135,679 | 6/1964 | Rothacker | 117—47 X |

ALFRED L. LEAVITT, *Primary Examiner.*

RICHARD D. NEVIUS, *Examiner.*

J. P. McINTOSH, W. L. JARVIS, *Assistant Examiners.*